UNITED STATES PATENT OFFICE.

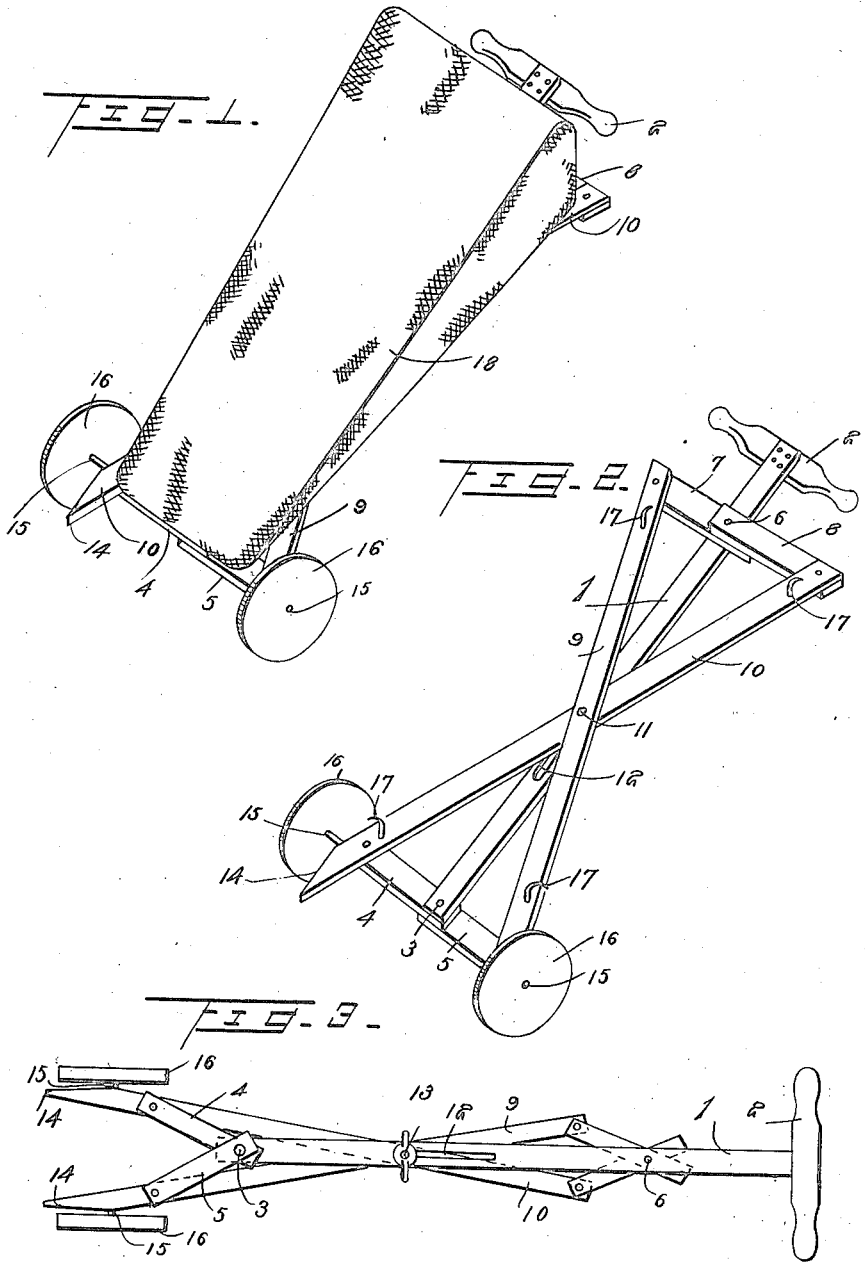

ALMA A. GAHEN, OF TEANECK, NEW JERSEY.

TRUCK.

1,229,933.          Specification of Letters Patent.      Patented June 12, 1917.

Application filed June 10, 1916. Serial No. 102,906.

*To all whom it may concern:*

Be it known that I, ALMA A. GAHEN, a citizen of the United States, residing at Teaneck, in the county of Bergen and State of New Jersey, have invented certain new and useful Improvements in Trucks; and I do hereby declare the following to be a full, clear, and exact description of the invention, such as will enable others skilled in the art to which it appertains to make and use the same.

This invention relates to new and useful improvements in trucks and the principal object of the invention is to provide a truck particularly adapted for use by shoppers for carrying packages.

The principal object of the invention is to provide a light, strong and durable truck which may be folded into a compact article when not in use and when so desired may be opened in position to receive a suitable bag or other receptacle for carrying packages and the like.

With these and other objects in view, the invention consists in the novel combination and arrangement of parts which will be fully set forth in the following specification and accompanying drawing, in which:—

Figure 1 is a perspective view of the device showing the same in use,

Fig. 2 is a view similar to Fig. 1 showing the truck with the bag removed, and

Fig. 3 is a bottom plan view of the truck showing the same in its folded position.

Referring to the drawing the numeral 1 designates the main standard or supporting bar of the truck provided at one end with the handle 2. The opposite end has pivoted thereto as at 3, a pair of laterally extending links 4 and 5. Pivoted as at 6 near the opposite end of the standard or bar 1 are the links 7 and 8 which correspond to the links 4 and 5 as clearly shown in the drawing. A cross bar 9 is connected to the outer end of the link 5 and connected in a similar manner to the outer end of the link 7 so that the same extends diagonally from one end of the truck to the other when the device is in its open position. A similar bar 10 extends from the outer end of the link 8 to the outer end of the link 4 and it will be seen that the bars 9 and 10 cross centrally and are pivoted together by a bolt 11 which extends through each of the bars and through the slot 12 in the standard 1. A thumb screw 13 is threaded on the under side of the bolt to engage the bar 12 and hold the device in its open position. The outer edges of the forward ends of the cross bars 9 and 10 are inclined as at 14 and carry the studs 15 on which the wheels 16 are journaled and it will thus be seen that when the device is in open position, the same may be rolled by supporting the handle 2. Secured near opposite ends of the bars 9 and 10 are the hooks 17 which are adapted to pierce the material from which the bag designated by the numeral 18 is constructed to hold said bag firmly in place.

It will be apparent from the foregoing that in use the device is opened in the manner illustrated in Fig. 2 and the bag attached thereto as shown in Fig. 1. It will thus be apparent that the bag will be in a position to receive various articles and the truck may be rolled along and the articles may thus be readily transported. When it is desired to carry the device without rolling the same it may be folded in the manner illustrated in Fig. 3 and form a compact bundle which will occupy a minimum amount of space.

While in the foregoing there has been shown and described the preferred embodiment of this invention, it is to be understood that such changes may be made in the combination and arrangement of parts as will fall within the spirit and scope of the appended claims.

What is claimed is:—

1. A shopping truck comprising a central handle bar, a handle at one end of said bar, diagonal cross bars pivoted centrally to the handle bar, links connecting the ends of the cross bars with the ends of the handle bar, wheels at the ends of the cross bars opposite the handled end of the handle bar, and hooks for supporting a shopping bag on the truck.

2. A shopping truck comprising a handle bar having a longitudinal slot formed centrally thereof, a handle at one end of the bar, cross bars pivoted together centrally, a bolt forming the pivot of said bars, said bolt extending through the slot, a thumb nut on the end of the bolt for holding the truck in its open or closed position, links connecting the ends of the cross bars with the handle bar, wheels on the ends of the cross bars opposite the handle, and hooks near opposite ends of the cross bars for supporting a shopping bag on the device.

In testimony whereof I affix my signature in presence of two witnesses.

ALMA A. GAHEN.

Witnesses:
    FLORENCE E. CAMPBELL,
    MARY J. CARVAN.